(12) United States Patent
Vetterli (10) Patent No.: US 10,092,015 B2
(45) Date of Patent: Oct. 9, 2018

(54) DEVICE AND METHOD FOR GENERATING MILK FROTH

(71) Applicant: Franke Kaffeemaschinen AG, Aarburg (CH)

(72) Inventor: Heinz Vetterli, Wangen (CH)

(73) Assignee: Franke Kaffeemaschinen AG, Aarburg (CH)

( * ) Notice: Subject to any disclaimer, the term of this patent is extended or adjusted under 35 U.S.C. 154(b) by 197 days.

(21) Appl. No.: 14/944,636

(22) Filed: Nov. 18, 2015

(65) Prior Publication Data

US 2016/0135474 A1 May 19, 2016

(30) Foreign Application Priority Data

Nov. 18, 2014 (DE) .................... 10 2014 223 550

(51) Int. Cl.
| | | |
|---|---|---|
| B01F 3/04 | (2006.01) | |
| A23C 9/00 | (2006.01) | |
| A23C 9/152 | (2006.01) | |
| A47J 31/44 | (2006.01) | |
| B01F 5/06 | (2006.01) | |
| B01F 15/06 | (2006.01) | |

(52) U.S. Cl.
CPC ......... *A23C 9/1524* (2013.01); *A47J 31/4485* (2013.01); *B01F 3/04* (2013.01); *B01F 3/04099* (2013.01); *B01F 3/04446* (2013.01); *B01F 3/04787* (2013.01); *B01F 3/04985* (2013.01); *B01F 5/0605* (2013.01); *B01F 15/06* (2013.01); *B01F 2015/062* (2013.01); *B01F 2215/0006* (2013.01)

(58) Field of Classification Search
CPC ...... A47J 31/4485; A23C 9/00; A23C 9/1524; B01F 3/04; B01F 3/04099; B01F 3/04446; B01F 3/04787; B01F 15/06; B01F 5/0605
USPC .......................................... 261/76
See application file for complete search history.

(56) References Cited

U.S. PATENT DOCUMENTS

| 8,357,416 B2 | 1/2013 | Schindler et al. |
| 8,657,262 B2 | 2/2014 | Burri et al. |
| 9,381,473 B2 * | 7/2016 | Bonsch ............... A47J 31/4485 |

(Continued)

FOREIGN PATENT DOCUMENTS

| DE | 102011108810 | 1/2013 |
| EP | 0077652 | 4/1983 |
| EP | 0485350 | 5/1992 |

(Continued)

*Primary Examiner* — Robert A Hopkins
(74) *Attorney, Agent, or Firm* — Volpe and Koenig, P.C.

(57) ABSTRACT

A device for generating milk froth, including a pump for conveying milk from a reservoir, an air intake, and at least one back-pressure element, with the back-pressure element being arranged upstream in reference to the pump and the air intake upstream in reference to the back-pressure element. The back-pressure element is embodied as a mixing element, which has in the direction of flow a cross-sectional area that the flow passes through that is not reducing, with the cross-sectional area that the flow passes through at the input side being at least equivalent to the cross-section of the connecting pipeline arranged between the pump and the mixing element. A method for generating milk froth as well as the use of a helical mixer for the generation of milk froth are also provided.

19 Claims, 12 Drawing Sheets

(56) References Cited

U.S. PATENT DOCUMENTS

2009/0087532 A1 4/2009 Meier
2015/0061165 A1 3/2015 Barth

FOREIGN PATENT DOCUMENTS

| EP | 0626148 | 11/1994 |
| EP | 2042063 | 4/2009 |
| EP | 2298142 | 3/2011 |
| WO | 2008083941 | 7/2008 |

\* cited by examiner

DEVICE AND METHOD FOR GENERATING MILK FROTH

INCORPORATION BY REFERENCE

The following documents are incorporated herein by reference as if fully set forth: German Patent Application No. 102014223550.2, filed Nov. 18, 2014.

BACKGROUND

The invention relates to a device for generating milk froth as well as a method for generating milk froth.

Due to the popularity of coffee-milk mixed drinks, devices for frothing milk are increasingly in use. Here, particularly in the restaurant field, high requirements are set for the quality of the froth generated. Several methods are known to generate milk froth:

A milk container that can be heated is known from EP 0 626 148 A1, comprising a resistance valve for frothing milk. The resistance valve comprises a rod-shaped element and a lamellae-like structure provided at its perimeter, which forms a labyrinth-like passage, with the milk being pressed through it. At the circumference of the rod-shaped element annular lamellae with unevenly distributed recesses are inserted at a regular distance from each other. By the resistance valve a repeated acceleration and deceleration of the milk-air mixture occurs, thus a repeated increase and reduction in pressure, as well as a turbulent mixing.

It is known from EP 0 485 350 A1 to generate warm milk froth by way of conveying milk via a pump from a reservoir, introducing air thereto, and subsequently, if necessary, heating the milk froth in a continuous-flow heater. In the outlet line, downstream in reference to the pump, a reduction of the cross-section is found, which leads to an increase in pressure. The reduction in cross-section is yielded by a rod-shaped element arranged in the outlet line, which can extend to the continuous-flow heater.

From WO 2008/083941 A1 it is known to convey milk via a pump to a throttle, and subsequently to convey the milk froth optionally directly to an outlet for dispensing cold milk froth or via a continuous-flow heater to an outlet for dispensing warm milk froth.

From EP 2 298 142 A1 it is known to increase the quality of the milk froth by using an intermittent air valve.

In the latter-most device mentioned the increase in pressure occurs by a throttle. A throttle or a throttle site is formed by a reduction in cross-section and perhaps a subsequent expansion in cross-section in the outlet pipe, downstream in reference to the pump.

SUMMARY

The present invention is based on the objective to further develop the methods and devices known from prior art for the generation of milk froth.

This objective is attained in a device for the generation of milk froth and in a method for generating milk froth including one or more features of the invention, as well as through the use of a helical mixer as the element increasing pressure during the generation of milk froth according to the invention.

Advantageous embodiments of the device and method according to the invention are disclosed below and in the claims.

The device according to the invention is preferably embodied for the execution of the method according to the invention, particularly a preferred embodiment thereof. The method according to the invention is preferably embodied for implementation via a device according to the invention, particularly a preferred embodiment thereof.

The device according to the invention for generating milk froth comprises a pump to convey milk from a reservoir, an air intake, and at least one back-pressure element. The back-pressure element is arranged downstream in reference to the pump. The air intake is arranged upstream in reference to the back-pressure element.

It is essential that the back-pressure element is embodied as a mixing element, with the mixing element comprising a non-tapering cross-sectional area in the direction of flow.

Additionally, the area that the flow passes through at the inlet side is at least equivalent to the cross-section of a connecting pipeline arranged between the pump and the mixing element.

The device according to the invention differs therefor from devices of prior art particularly in the fact that the back-pressure element is embodied as a mixing element and shows no reducing cross-sectional area in the direction of flow. Here an increase in pressure occurs in the device according to the invention as well by the mixing element so that upstream in reference to the mixing element a higher pressure is given compared to the pressure downstream in reference to the mixing element. The mixing element therefore represents an alternative back-pressure element to the use of throttles or a resistance flow valve of prior art, which forms a labyrinth passage. This way, in spite of the similar function as a back-pressure element, advantageous technical differences in functionality develop.

The mixing element leads to a mixing of the fluid flow passing through the mixing element without here any reduction of the cross-sectional area that the flow passes through being given. Compared to a throttle or a labyrinth passage with repeatedly changing cross-sectional areas that the flow passes through, here in the mixing element a laminar or at least considerably less turbulent flow results compared to a throttle or an above-described labyrinth passage.

Accordingly, here a lower dependency is yielded from the consistency of the fluid, for example the temperature of the milk or the density of the milk due to varying fat content. As a result, a more consistent froth quality can be yielded even in case of varying temperatures and/or composition of the milk used.

In general, additionally the advantage develops that compared to the back-pressure elements of prior art, here a more thorough mixing of the milk/air emulsion can be achieved with lower reduction in pressure.

Furthermore, based on the consistent or expanding cross-sectional area that the flow passes through the risk is not given that residual liquids adhere at the projecting lamellae or the throttle blades and/or their lee side of flow, so that reliable cleaning is achieved.

In the device according to the invention the mixing element acting as the back-pressure element causes an elevated pressure in the area between the pump and the mixing element. When flowing through the mixing element in the direction of flow, the pressure is increased therefore over a longer flow path so that a slower relaxation occurs. This is advantageous for the quality of the milk froth generated.

The objective underlying the invention is further attained in a method for generating milk froth. The method according to the invention comprises the following processing steps:

In a processing step A, milk is conveyed via a pump from a reservoir. In a processing step B the supply of air to the milk occurs, and in a processing step C the air-froth mixture and/or the milk froth is guided through the back-pressure element at the pressurized side of the pump.

These processing steps are generally known from methods of prior art for the generation of milk froth. It is essential that in the method according to the invention a mixing element is used as the back-pressure element, which shows in the direction of flow a cross-sectional area of flow that is not tapering, which at the inlet side is at least equivalent to the cross-section of the pipeline of a connection line arranged between the pump and the mixing element.

The method according to the invention is therefore characterized in that an increase in pressure is not achieved by changing the cross-sectional area that the flow passes through, for example via a throttle or a labyrinth passage, but via a mixing element with a cross-sectional area that the flow passes through that is not tapering.

This way, the advantages result, already mentioned above in the description of the device according to the invention.

Furthermore, the method according to the invention and the device according to the invention show the advantage that the back-pressure element, embodied as a mixing element, can contribute twofold to the generation of milk froth: on the one hand, due to the increase in pressure the generation of milk froth can occur entirely or at least essentially based on the mixing process in the pump. This is particularly the case in a preferred embodiment in which the pump is implemented as a gear pump. If any mixing sufficient for the generation of the milk froth does not occur or only to an incomplete extent upstream in reference to the mixing element, now the mixing process in the mixing element itself contributes to the formation of milk froth.

In a preferred embodiment of the device according to the invention the mixing element comprises at least two separating elements. The separating elements are embodied cooperating and arranged behind each other in the flow path of a fluid flowing through the mixing element such that a splitting occurs into two or more partial flows and a mixing of the partial flows of the fluid flowing through.

This way, in a technically inexpensive fashion, a mixing element can be realized forming a back-pressure element, which in the direction of flow shows a cross-sectional area that the flow passes through that is not tapering.

In particular, an advantageous, simply designed embodiment results, in which at least a first separating element is arranged in the flow path of the fluid flowing through, which first separating element is embodied to split the fluid flowing into the mixing element into at least a first and a second partial flow. Furthermore, in the flow path of the mixing element, downstream in reference to the first separating element, at least one second separating element is arranged. The second separating element is embodied to split both the first as well as the second partial flow of the first separating element and embodied cooperating with the first separating element such that a portion of the first partial flow of the first separating element is combined with a portion of the second partial flow of the first separating element to form a new partial flow.

This way, in a simple fashion, an effective missing and simultaneously an increase in pressure can be achieved. In particular, in a more simply designed embodiment, a series of several separating elements can be given, particularly several groups of the above-described group of the first and second separating element. In order to yield a mixing and pressure increased preferred for the generation of milk froth, preferably at least three, preferred at least five, particularly preferred at least eight separating elements are provided arranged successively.

Another improvement of the mixing and pressure increase occurs in a preferred embodiment in which the separating elements additionally are embodied to form at least sectionally partial flows showing helical flow paths. By the helical flow path, here the pressure increase is amplified and simultaneously also the mixing itself is enabled by a partial flow while traveling through the helix-like flow paths.

In particular, in order to increase the mixing function and the pressure increase it is advantageous if the direction of rotation of the helical flow path of the first separating element is opposite the direction of rotation of the helical flow path of the second separating element.

In a preferred embodiment, in which several groups of the above-described groups of first and second separating elements are provided, the separating elements are therefore preferably arranged such that in the direction of flow an alternating direction of rotation is embodied.

The above-mentioned advantages and simply designed embodiments are particularly achieved in a preferred embodiment in which the separating elements are designed as helical elements. In particular the mixing element is therefore embodied as a helical mixer. Helical mixers are known from prior art for mixing two component adhesives. Here, unlike in the use claimed in the present case for a device for generating milk froth, a mixing of two different liquids occurs, which cannot be compressed.

As described above, the use of the mixing element as the back-pressure element avoids the disadvantages of a throttle point, particularly in that no strongly turbulent flow areas develop.

Therefore, in a preferred embodiment no throttle sites are provided in the pipeline between the pump and the mixing element. In particular, it is advantageous that the cross-sectional area that the flow passes through in the flow path between the pump and the mixing element shows no constriction.

Furthermore, the above-mentioned disadvantages are particularly avoided when the cross-sectional area that the flow passes through in the flow path between the pump and the outlet for the milk froth is not tapering, with the outlet being arranged downstream in reference to the mixing element. In the latter-most preferred embodiment therefore downstream in reference to the pump to the outlet of the milk froth no reduction of the cross-sectional area that the flow passes through occurs, so that in the entire pipeline path downstream in reference to the pump the above-mentioned disadvantages are avoided.

The scope of the invention includes that the condition of a non-tapering cross-sectional area that the flow passes through is yielded by a constant cross-sectional area that the flow passes through, which therefore shows a constant area size, perhaps however a changing shape. Additionally, in a plurality of sections an enlargement of the cross-sectional area that the flow passes through can occur, particularly a gradually and/or stepped enlargement.

The cross-sectional areas and particularly the interior diameter of the pipelines and the mixing element as well as perhaps additional components, such as valves and continuous-flow heaters, may be included in the scope of such devices and methods, in consideration of the above-stated additional conditions, particularly with regards to the cross-sectional area of the mixing element that the flow passes through in the direction of flow. In particular, the scope of the invention includes cross-sectional areas that the flow passes through at a range from 2 mm² to 15 mm².

Preferably the pump is embodied as a gear pump. Furthermore, the air intake is preferably arranged at the suction side of the pump. This way, as described above, in combination with the increased pressure due to the mixing element here qualitatively particularly high-value milk froth develops, because the milk froth is essentially already formed in the pump from the milk/air mixture suctioned in.

The cross-sections of the pipeline, the embodiment of the pump, and the mixing element are preferably embodied cooperating such that a pressure difference forms between the inlet and the outlet of the mixing element ranging from 2 bar to 15 bar, preferably at least 3 bar, and particularly at least 5 bar. This way, an advantageous pressure increase is achieved to form milk froth, particularly when the pump is embodied as a gear pump.

Based on the strong demand for coffee—mixed drinks, increasingly cold coffee—mixed drinks are also desired. Preferably, in the device according to the invention here two parallel flow path sections are provided for the optional generation of warm or cold milk froth, with a continuous-flow heater being arranged in a first flow path section.

Therefore, in a simple fashion, by selecting the flow path comprising the first flow path section here warm milk froth can be generated via the continuous-flow heater. Additionally, by selecting the second flow path section cold milk froth can be generated, without in this case the continuous-flow heater being that the flow passes through.

A particularly simple embodiment of such a preferred embodiment for the optional generation of warm or cold milk froth develops when branching is provided at the pressure side of the pump into the two parallel flow path sections. Here, in a simple fashion a two-way valve may be provided for selecting a flow path section to be that the flow passes through. Additionally, a Y-line branching may be provided, in which in every flow path section respectively one valve is provided so that by an appropriate opening of one of the two valves one of the two parallel flow path sections can be selected. In this preferred embodiment, the mixing element is preferably arranged at least in the second parallel flow path section without a continuous-flow heater.

In general, the use of the mixing element as a back-pressure element is suitable for both the generation of warm as well as the generation of cold mixing froth. In particular, an advantageous application for the generation of cold milk froth develops. The scope of the invention therefore includes, in case of the embodiment of the device for an optional generation of warm or cold milk froth, to provide a joint back-pressure element embodied as a mixing element in a common flow path, for example directly or near the pressure outlet of the pump. The scope of the invention also includes to provide at least one back-pressure element in each of the two parallel flow path sections, preferably precisely one back-pressure element each, with at least one of the two back-pressure elements being embodied as a mixing element and particularly the back-pressure element being preferably embodied as a mixing element in the flow path section without a continuous-flow heater. The other back-pressure element may be embodied in a manner known per se as a throttle or as a labyrinth passage. In particular, it is advantageous, though to provide in both parallel flow path sections a back-pressure element respectively embodied as a mixing element.

In the method according to the invention the milk froth is preferably generated from refrigerated milk and subsequently heated, particularly preferred optionally heated, with the heating preferably occurring by a continuous-flow heater. Therefore, even when discharging warm milk froth, preferably essentially a generation of cold milk froth occurs and a subsequent heating of the cold milk froth, particularly via a continuous-flow heater. This way particularly high-quality warm milk froth is yielded.

As described above, it is advantageous that in the mixing element an essentially laminar mixing occurs in order to avoid the above-described disadvantages due to strong turbulences, for example when using a throttle.

In the method according to the invention, preferably at the pressure side of the pump, the milk-air mixture is optionally guided through a continuous-flow heater, with at least for the discharge of cold milk froth, circumventing the continuous-flow heater, the milk-air mixture is guided through a mixing element. This way, as described above, in a simple fashion both the discharge of cold as well as warm milk froth is possible.

The present invention is particularly based on the surprising acknowledgement that the use of a helical mixer as the back-pressure element offers the above-described advantages for the generation of milk froth. In particular, the use of a helical mixer avoids areas of highly turbulent flows, and on the one hand a pressure increase and on the other hand a slower relaxation is yielded in reference to throttles. Furthermore, the use of a helical mixer allows better mixing under identical pressure reduction.

These above-mentioned advantages are yielded in an elevated form by using a helical mixer with constant cross-sections that the flow passes through as the back-pressure elements when generating milk froth.

The use occurs preferably in the above-described device according to the invention, in particular in a preferred embodiment thereof and/or in a method according to the invention, particularly a preferred embodiment thereof.

In particular, it is therefore advantageous to use a helical mixer, particularly a helical mixer with a constant cross-sectional area that the flow passes through as the back-pressure element for the generation of milk froth with the conveyance of milk from a milk reservoir to a pump, with preferably at the suction side of the pump air being supplied and at the pressure side of the pump a back-pressure element being provided, embodied as a helical mixer.

BRIEF DESCRIPTION OF THE DRAWINGS

In the following, additional preferred features and preferred embodiments of the device according to the invention and the method according to the invention are described based on exemplary embodiments and the figures. Shown are.

DETAILED DESCRIPTION OF THE PREFERRED EMBODIMENTS

In the figures, identical reference characters mark identical or equivalently operating elements.

Figure 1:
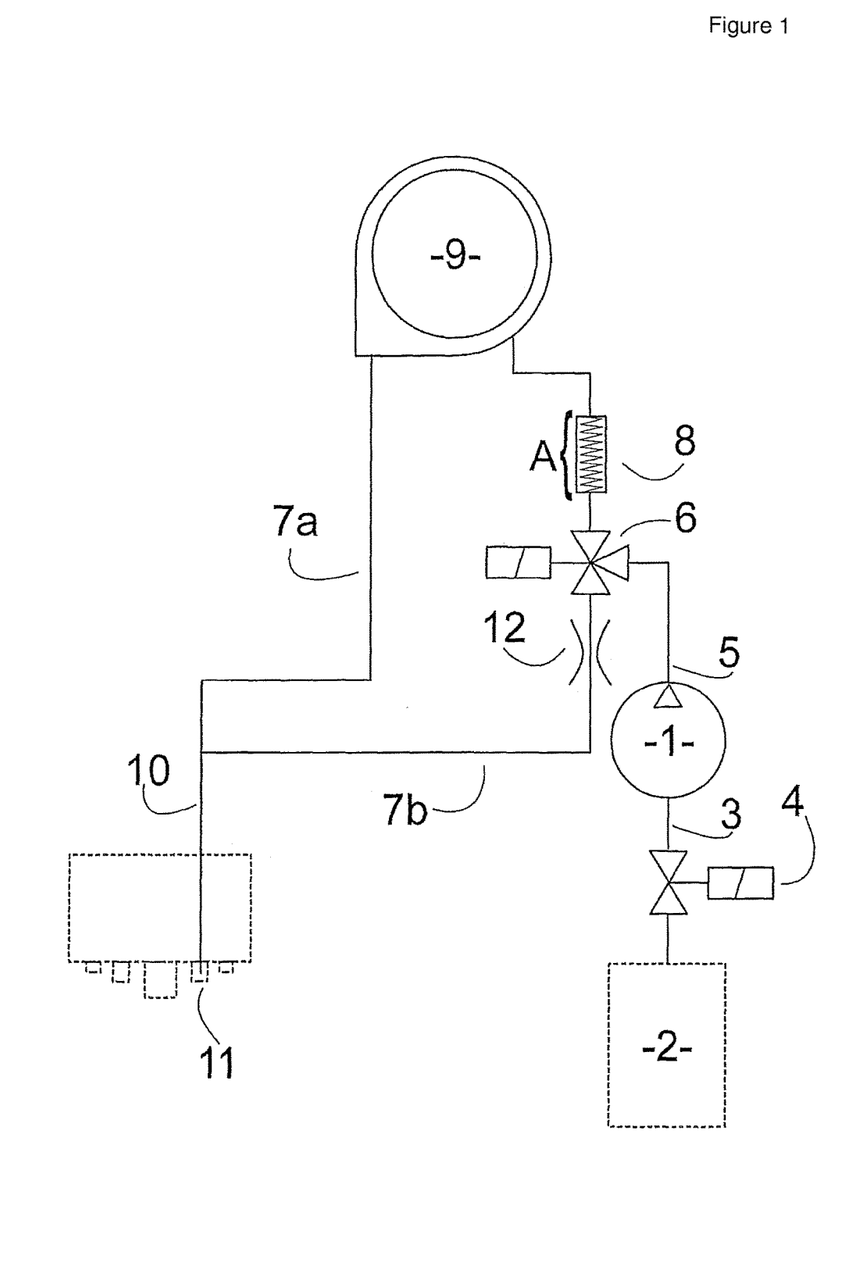
FIG. 1 a flow diagram of a first exemplary embodiment of a device according to the invention, FIG. 2 an illustration of a detail A according to FIG. 1, which comprises a mixing element, FIG. 3 a cross-section according to the section line B in FIG. 2, with the section line being perpendicular in reference to the drawing level in FIG. 2.

FIG. 1 shows a first exemplary embodiment of a device according to the invention for the generation of milk froth. The device comprises a pump 1, embodied as a gear pump, to convey milk from a milk reservoir 2 via a suction line 3. An air valve 4 is integrated in the suction line 3, in order to supply air to the milk during the suction process by the pump 1.

At the pressure side, the pump 1 is connected via the pressure line 5 to a two-way valve 6. Via said two-way valve 6 optionally a flow path is possible via a first or a second of two parallel flow path sections. The first flow path section 7a comprises downstream in reference to the two-way valve 6 a back-pressure element embodied as a mixing element 8 and further downstream a continuous-flow heater 9. Downstream in reference to the continuous-flow heater 9, the first flow path section 7a leads to a common outlet line 10, which ends in an outlet 11 of an automatic coffeemaker (not shown) so that the milk froth can be discharged via the outlet 11 together with the coffee into a container, such as a cup. The second flow path section 7b comprises a throttle 12 downstream in reference to the two-way valve 6. The second flow path section 7b also connects downstream in reference to the throttle 12 to the outlet line 10 and finally to the outlet 11.

In order to generate warm milk froth, here milk is conveyed via the pump 1, with at the suction side of the pump air being supplied via the air valve 4. At the pressure side of the pump the fluid is guided via the pressure line 5 and the first flow path section 7a to the continuous-flow heater 9, with based on the mixing element 8 in the flow path section 7a a pressure increase occurs at the pressure side of the pump so that milk froth forms, which is additionally mixed in the mixing element 8.

Via the continuous-flow heater 9 the milk froth is heated and then discharged to the outlet 11.

In order to generate cold milk froth, milk is also conveyed via the pump 1 from the milk reservoir 2, with at the suction side air being supplied via the air valve 4. Subsequently the flow path is selected via the second flow path section 7b, with here due to the throttle 12 the pressure is increased at the pressure side of the pump and cold milk froth is discharged from the outlet 11, circumventing the continuous-flow heater 9.

In another embodiment (not shown) the throttle 12 and the mixing element 8 are exchanged, so that when generating cold milk froth the flow passes through the mixing element 8 and when generating warm milk froth the flow passes through the throttle 12.

In another, particularly advantageous exemplary embodiment (not shown either), a mixing element is provided in both flow path sections (7a, 7b) each, i.e. in this exemplary embodiment the throttle 12 is also replaced by a mixing element, similar to the mixing element 8.

Figure 2:
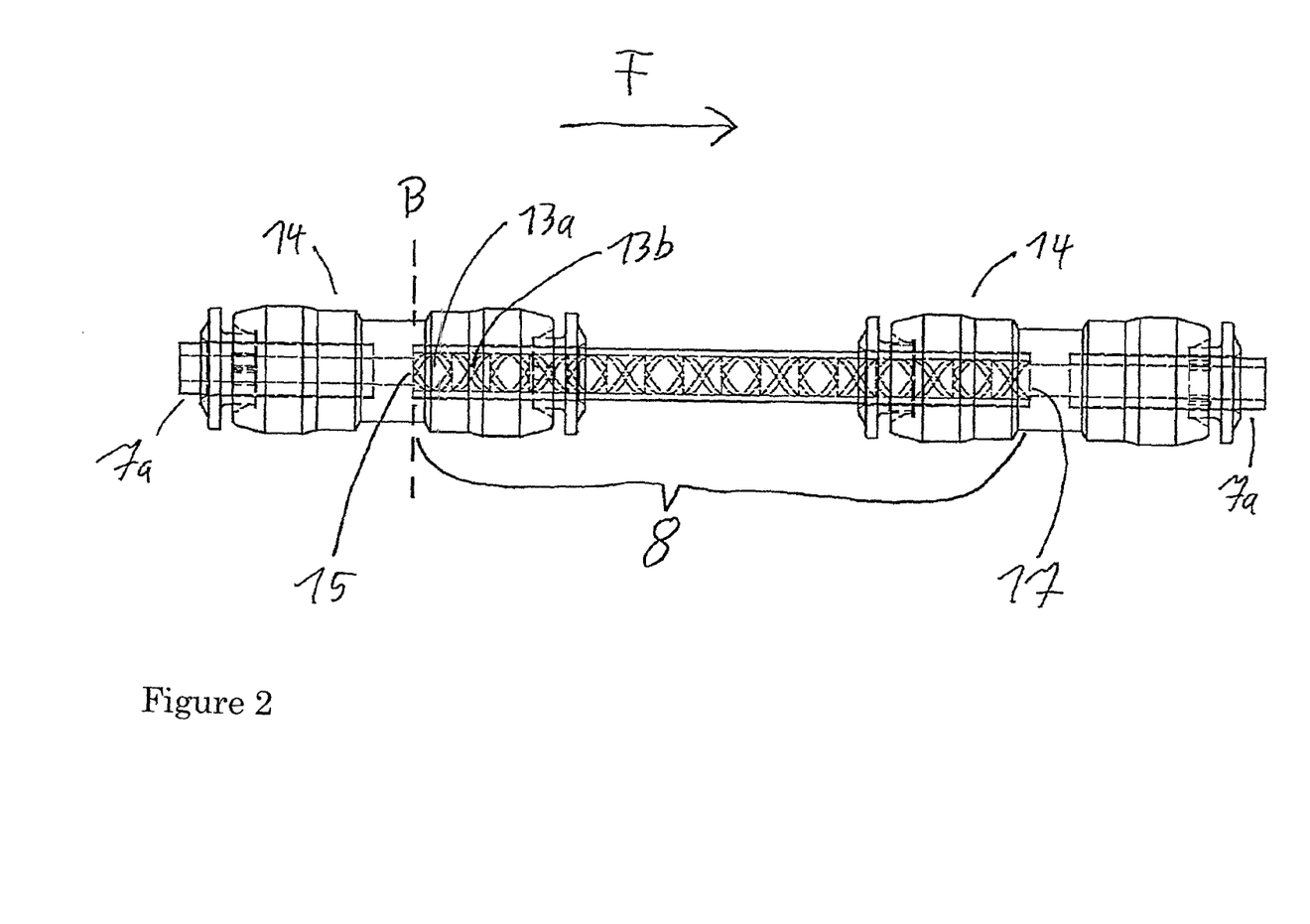

FIG. 2 shows a schematic illustration of a mixing element 8. Here, the mixing element 8 is shown in a cross-section, with the sectional level extending along a central axis of the essentially cylindrical mixing element 8.

The mixing element 8 shows an approximately cylindrical jacket. Inside thereof several separating elements are arranged, with FIG. 2 for example indicating a first separating element 13a and a second separating element 13b. The separating elements 13a and 13b are embodied as helixes, as explained in the following in greater detail in connection with FIGS. 4a and 4b.

As discernible from FIG. 2, a plurality of separating elements are arranged successively (in the present case 16 separating elements) in the direction of flow F of the mixing element 8. The separating elements are embodied and arranged such that a helical mixer is formed with alternating directions of rotation, as also explained in the following in greater detail in connection with FIGS. 4a and 4b.

It is essential that the cross-sectional area of the mixing element 8 that the flow passes through is not reducing in the processing direction. In the present case, the mixing element 8 is embodied such that the cross-sectional area that the flow passes through is constant in the processing direction with regards to the area size.

Figure 3:
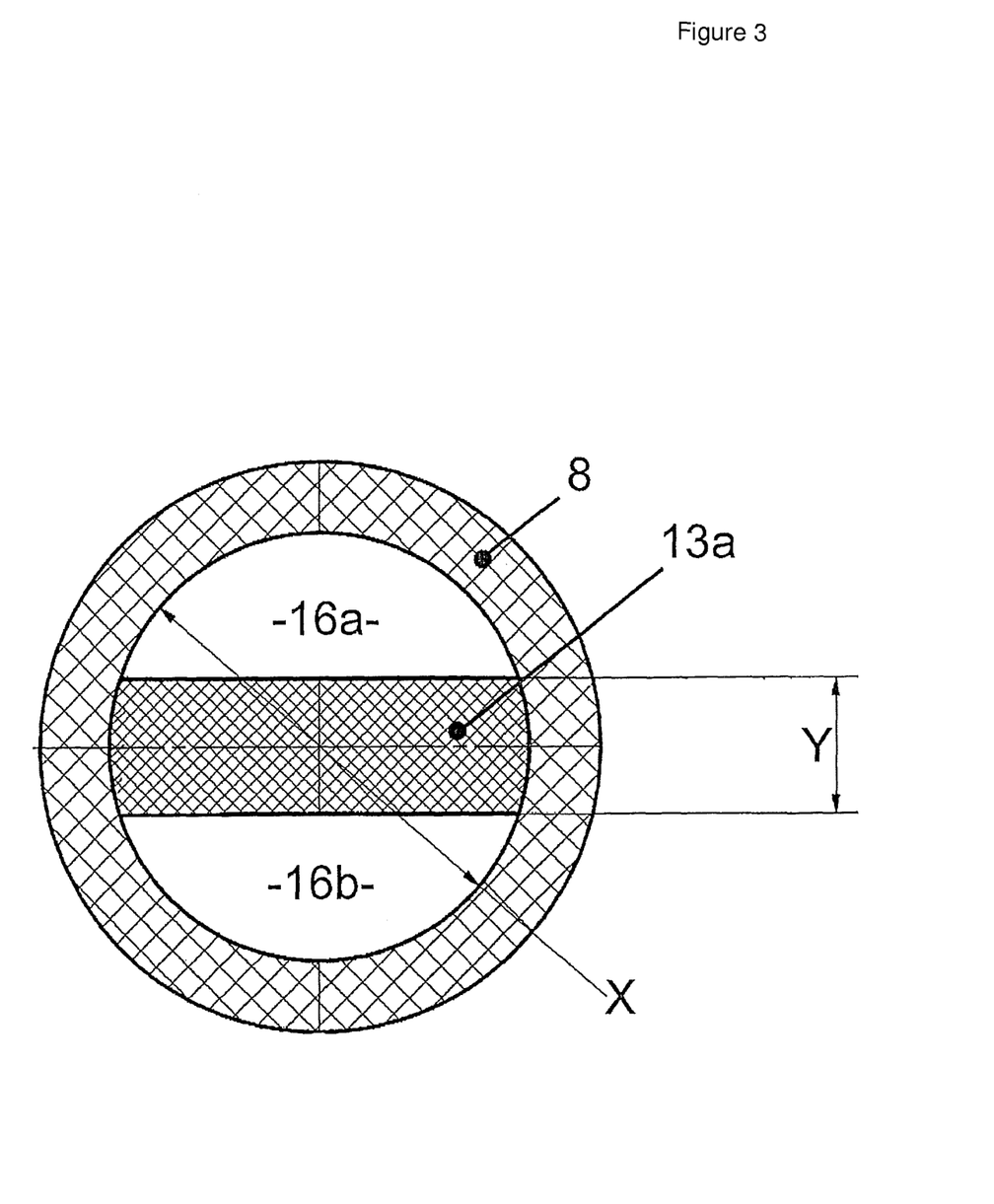

The mixing element 8 is connected upstream and downstream via plug-in connections 14 to the line of the first flow path section 7a. It is essential that the connection site 15 at the input side, at which at the input-side the pipeline of the flow-path section 7a abuts the mixing element 8, shows no reduction of the cross-sectional area that the flow passes through. In the present case, an expansion of the cross-sectional area that the flow passes through occurs, as explained in the following based on FIG. 3:

FIG. 3 shows a cross-sectional illustration according to the section line B in FIG. 2, with the sectional level being perpendicular in reference to the drawing level of FIG. 2. Only the elements of the mixing element 8 are illustrated, not the element of the plug-in connection 14.

As discernible from FIG. 3, the cylindrical exterior jacket of the mixing element 8 shows an annular cross-section. The separating element 13a comprises an approximately rectangular cross-section and abuts at two opposite sides in a fluid-tight fashion to the interior walls of the exterior jacket.

The cross-sectional areas 16a and 16b that the flow passes through therefore represent the flow range for the fluid at this input-side position of the mixing element 8. The total of the cross-sectional areas 16a and 16b, which therefore define at this position the cross-sectional area that the flow passes through, is greater than the (circular) cross-sectional area of the line of the first flow-path section 7a directly upstream the mixing element 8. At the output side of the element 8 that the flow passes through (at the connection site 17, see FIG. 2), the line of the flow path section 7a shows an interior diameter which may be equivalent to the interior diameter of the jacket of the mixing element 8. In the present case, the interior diameter of the flow-path section 7a at the connection site 17 is smaller than the interior diameter of the jacket of the mixing element 8, however it is selected such that in reference to the overall cross-sectional area of the mixing element (16a and 16b) that the flow passes through an enlargement of the cross-sectional area that the flow passes through at the outlet of the mixing element 8. From the outlet of the mixing element 8 therefore no reduction of the cross-sectional area that the flow passes through is given, but in the present case there is an expansion of the cross-sectional area that the flow passes through.

Figure 4A:
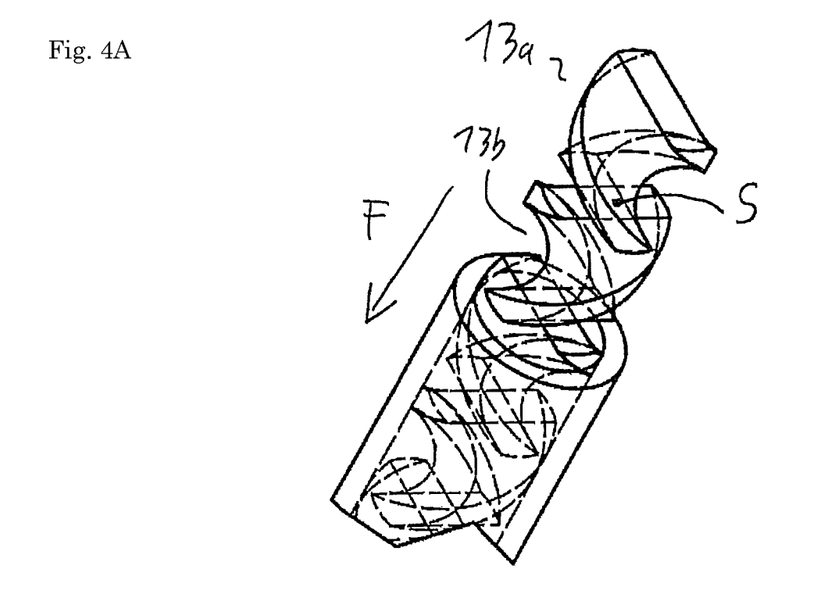
FIGS. 4a and 4b perspective views of the mixing element according to FIG. 2, and FIGS. 5 to 12: flow diagrams of additional exemplary embodiments of a device according to the invention.
Figure 4B:
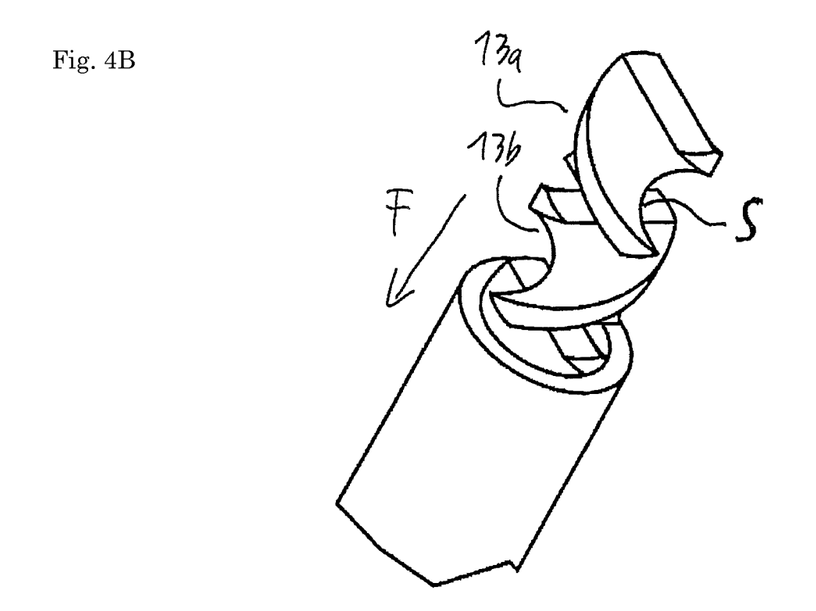

FIGS. 4a and 4b show details, respectively a perspective view of the separating elements 13a and 13b embodied as a helix.

The detail 4a shows here the separating elements 13a and 13b in a frontal area, with for better visibility the jacket area of the mixing element 8 is not shown. It is shown only in the rear section.

As discernible from FIG. 4a, the separating elements 13a and 13b are arranged directly behind each other and embodied as helixes. When the fluid flows in the direction of flow F through the mixing element 8, thus by the separating element 13a the fluid flux is divided into a first and a second partial flow. At the interface S, which the separating element 13a and the separating element 13b directly abut, the approximately rectangular cross-sectional areas of the separating elements are distorted by approximately 90° in reference to each other, so that the first and the second partial flow once more are divided such that a first half of the first partial flow is combined with a first half of the second partial flow to form a new partial flow, and accordingly a second half of the first partial flow is combined with a second half of the second partial flow to form a new second partial flow.

By the embodiment of the separating elements 13a and 13b as helixes, the partial flows respectively result in helical flow paths along the helixes.

Furthermore, the direction of rotation of the helical flow path of the helix 13a is opposite the direction of rotation of the helical flow path of the helix 13b. By the total of these measures, particularly a repeated division and combining the partial flows, helical flow paths as well as a change of the direction of rotation of the helical flow paths overall in a particularly effective mixing results and the feature of a back-pressure element.

FIG. 4b shows the same perspective view as FIG. 4a, however the separating elements are only indicated by their edges so that even edges located in the rear are discernible as dot-dash lines. Additionally, this way the position of the separating element is discernible inside the jacket of the mixing element 8.

In the exemplary embodiment according to FIG. 1 the lines show at the suction side of the pump as well as the air valve 4 an internal diameter of 2 mm (equivalent to a cross-sectional area that the flow passes through of approx. 3.14 mm$^2$). The mixing element shows an interior diameter of the jacket area (reference character X in FIG. 3) of 3 mm, the separating element 13a a thickness of approx. 95 mm (reference character Y in FIG. 3). This way, overall for the areas 16a and 16b a total cross-sectional area that the flow passes through is approx. 4.26 mm$^2$. The line following the mixing element 8 downstream to the continuous-flow heater 9 has an internal diameter of 2.5 mm (equivalent to a cross-sectional area that the flow passes through of approx. 4.91 mm$^2$). The continuous-flow heater has an interior diameter of 3 mm (equivalent to a cross-sectional area that the flow passes through of approx. 7.07 mm$^2$). The lines arranged downstream in reference to the continuous-flow heater also show an interior diameter of at least 3 mm.

In cooperation with the gear pump a pressure difference of approx. 5 bar results between the connection site 15 at the input side and the connection site 17 at the output side of the mixing element 8.

Figure 5:
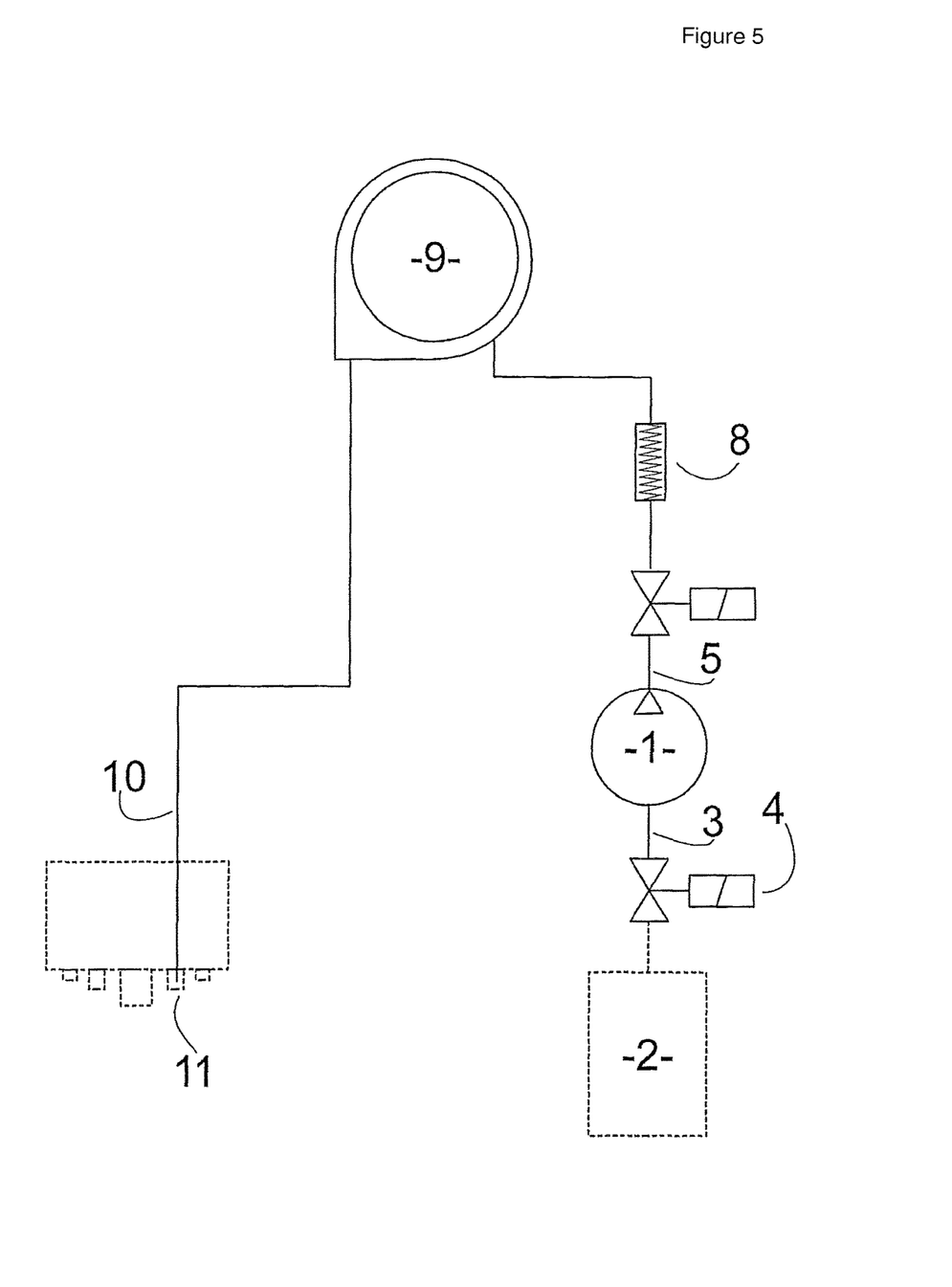
Figure 6:
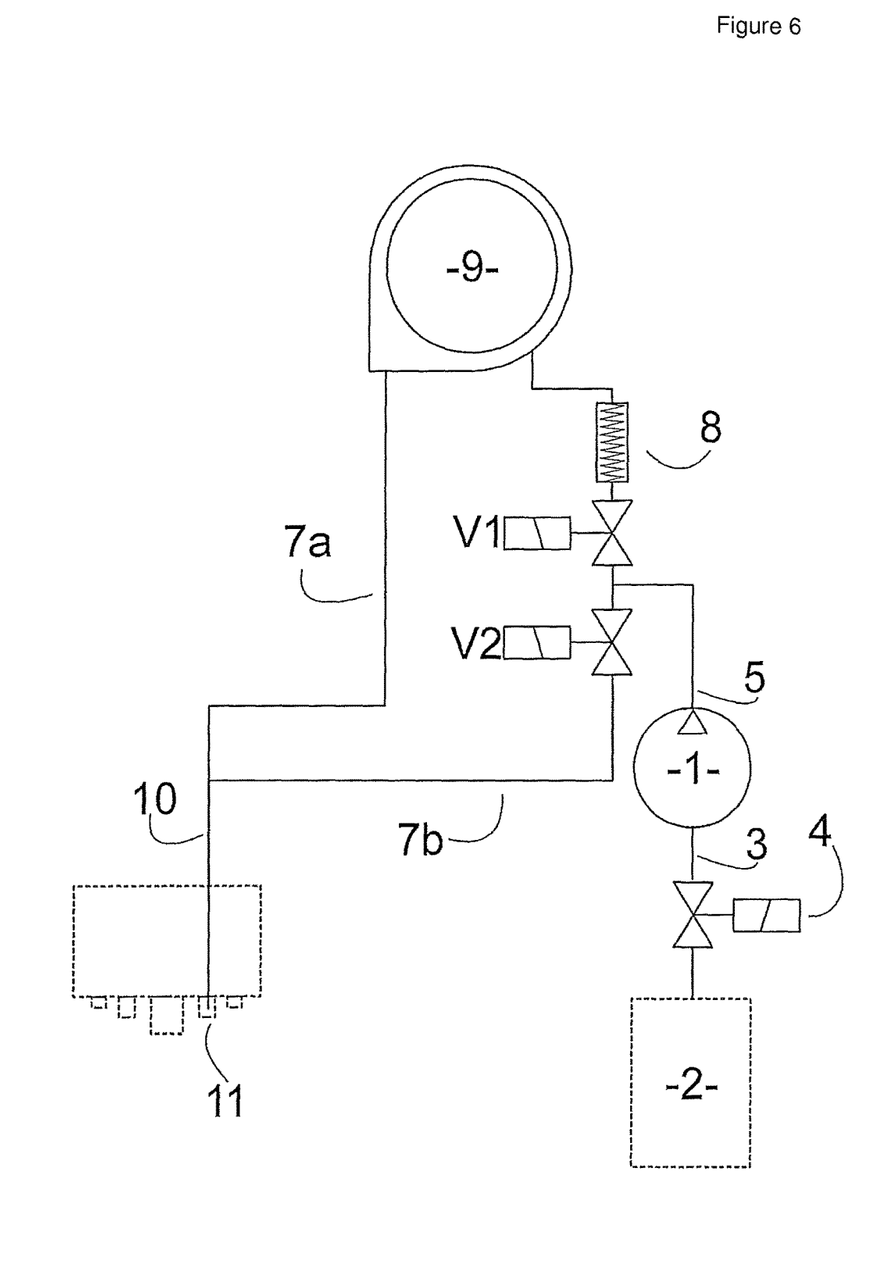

Additional exemplary embodiments of a device according to the invention are shown in other figures, with identical reference characters identifying the same or identically operating elements. In order to avoid repetitions, in the following only the essential differences are discussed in the flow diagram:

The exemplary embodiment according to FIG. 5 shows no parallel flow sections. The milk conveyed via the pump 1 is always guided via the pressure line 5, in which the mixing element 8 is arranged, via the continuous-flow heater 9 to the outlet 11. Here, by shutting-off the continuous-flow heater 9, cold milk froth can be generated. The exemplary embodiment according to FIG. 6 shows two parallel line sections, with only in the parallel line section with the continuous-flow heater 9 a mixing element 8 being arranged. The other parallel line section shows neither a back-pressure element nor a continuous-flow heater and only serves to dispense cold milk from the outlet 11.

Here, the branching at the pressure side of the pump in the two parallel line sections is embodied as a Y-line section and two valves V1 and V2 are provided so that by opening one of the two valves one of the two parallel sections can be selected as a flow path. Alternatively, instead of the Y-line section, here a two-way valve may also be selected so that the valves V1 and V2 can be omitted.

Figure 7:
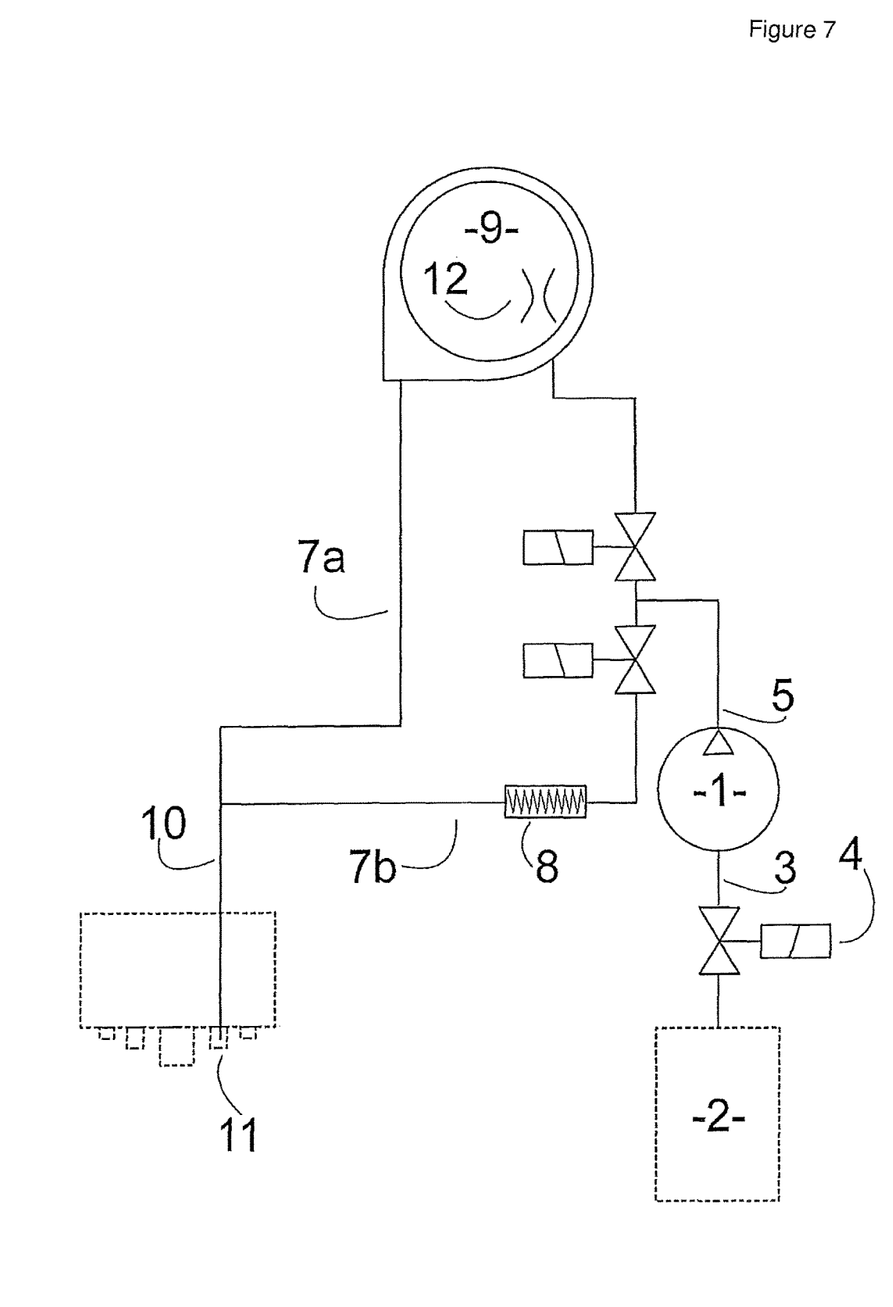

FIG. 7 shows an exemplary embodiment with a flow diagram similar to the exemplary embodiment shown in FIG. 6. However, in the exemplary embodiment according to FIG. 7, the mixing element 8 is arranged in the parallel line section without the continuous-flow heater 9. Furthermore, a throttle site is integrated in the continuous-flow heater 9. When generating cold milk froth, therefore the mixing element 8 serves as a back-pressure element and when generating warm milk froth the throttle site integrated in the continuous-flow heater 9 serves as a back-pressure element.

Figure 8:
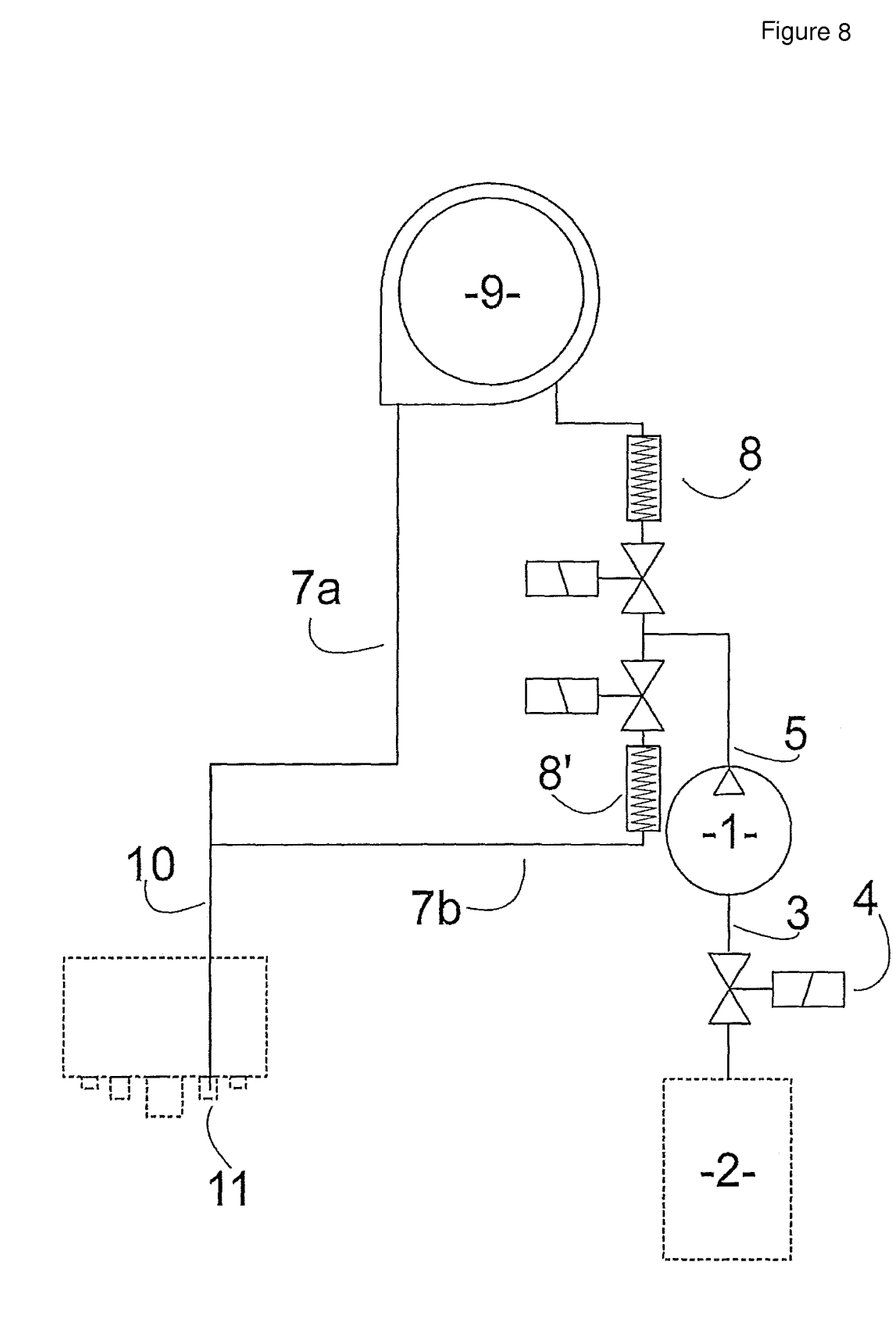
Figure 9:
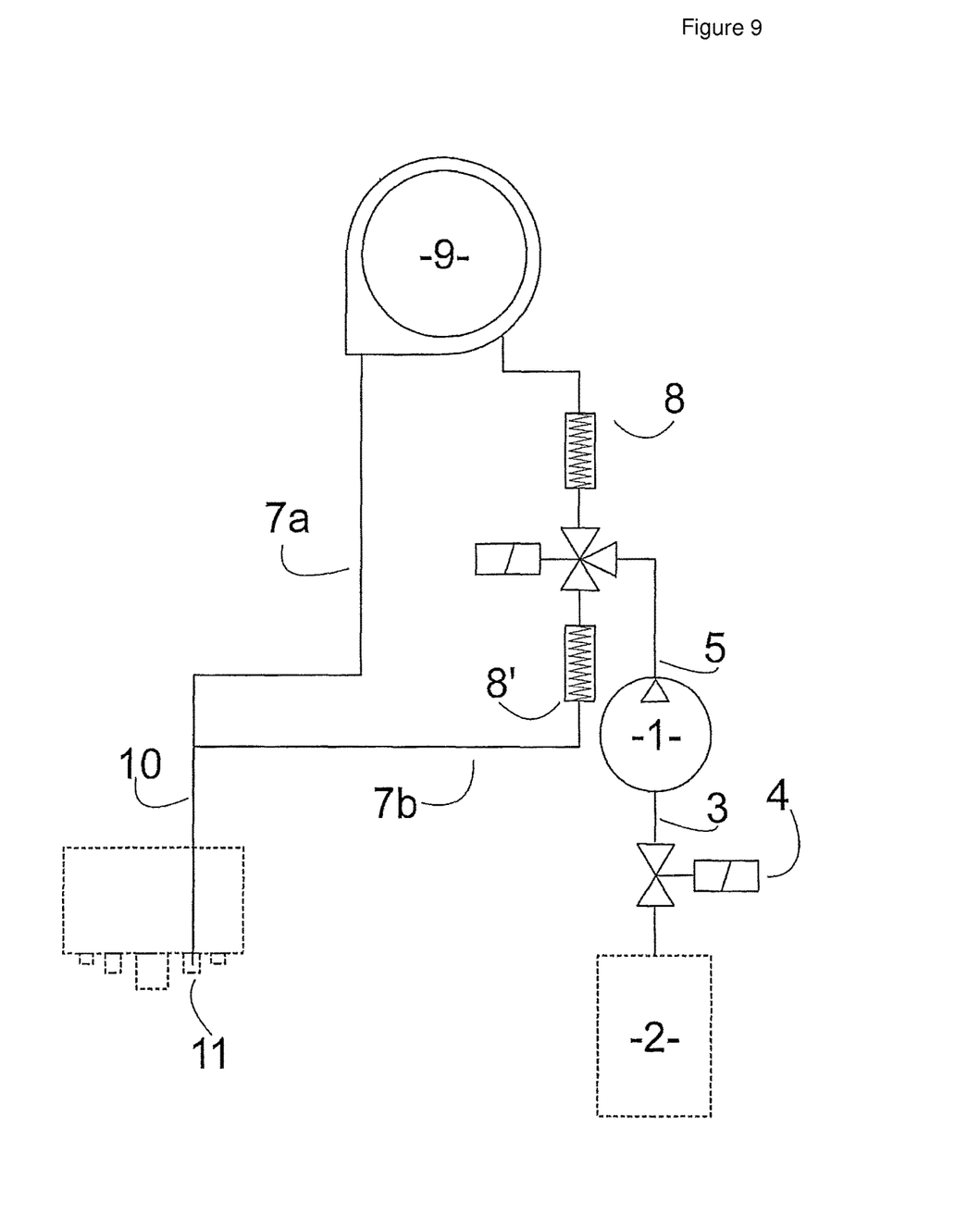

FIGS. 8 and 9 show two additional exemplary embodiments with a flow diagram similar to the one of the first exemplary embodiment according to FIG. 1.

In the exemplary embodiment according to FIG. 8, however the throttle 12 according to FIG. 1 is replaced by a second mixing element 8'. Additionally, the two-way valve 6 is replaced by two valves V1 and V2, which are arranged respectively downstream in reference to a Y-branching of the pressure line 5.

In the exemplary embodiment FIG. 9 however, similar to FIG. 1, a two-way valve 6 is provided in order to allow selecting the flow path via the continuous-flow heater 9 or to the outlet 11, circumventing the continuous-flow heater 9.

Figure 10:
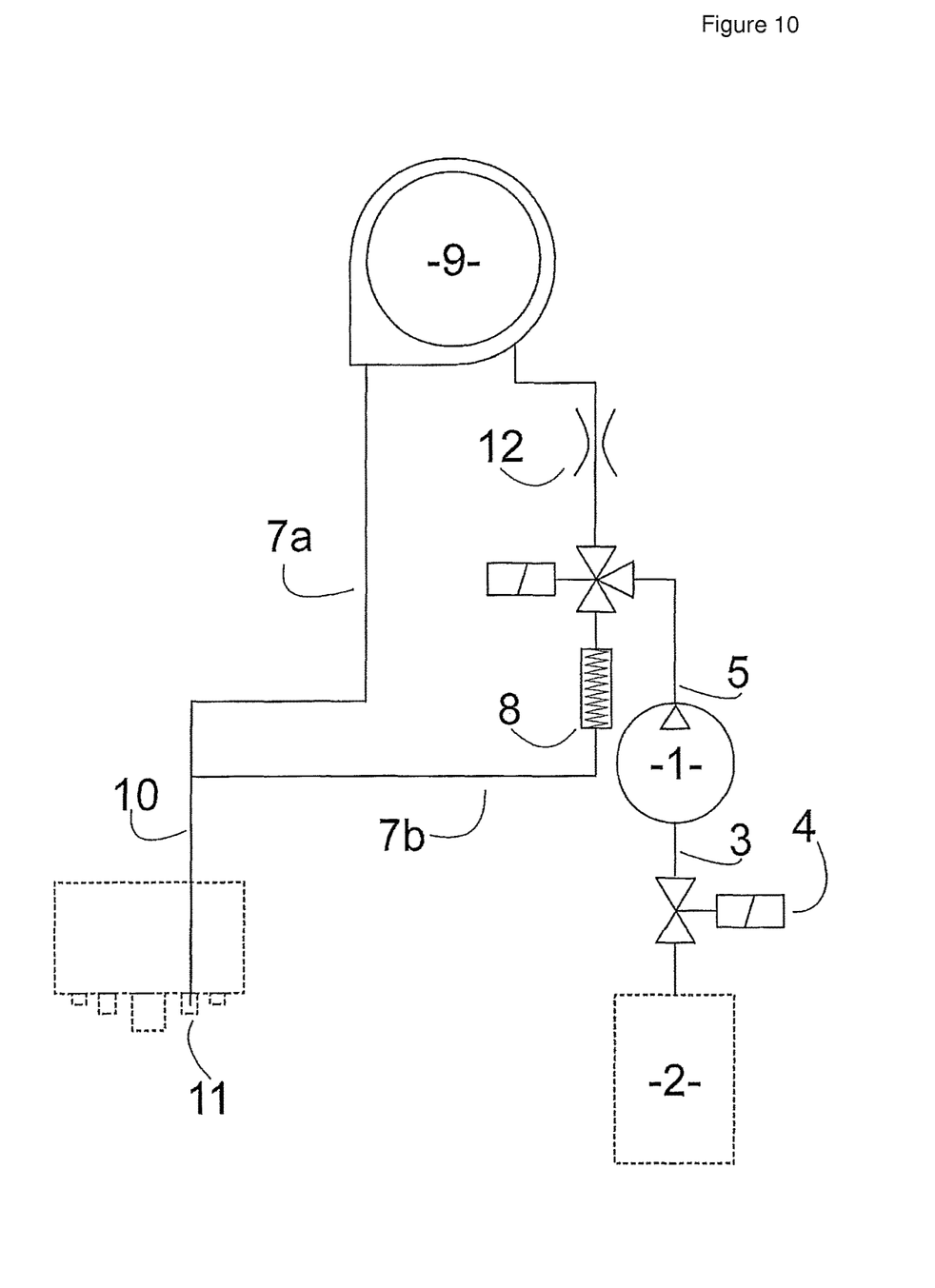

FIG. 10 shows another exemplary embodiment with a similar flow diagram as the first exemplary embodiment according to FIG. 1. However, here the position of the mixing element 8 and the throttle 12 are exchanged.

Figure 11:
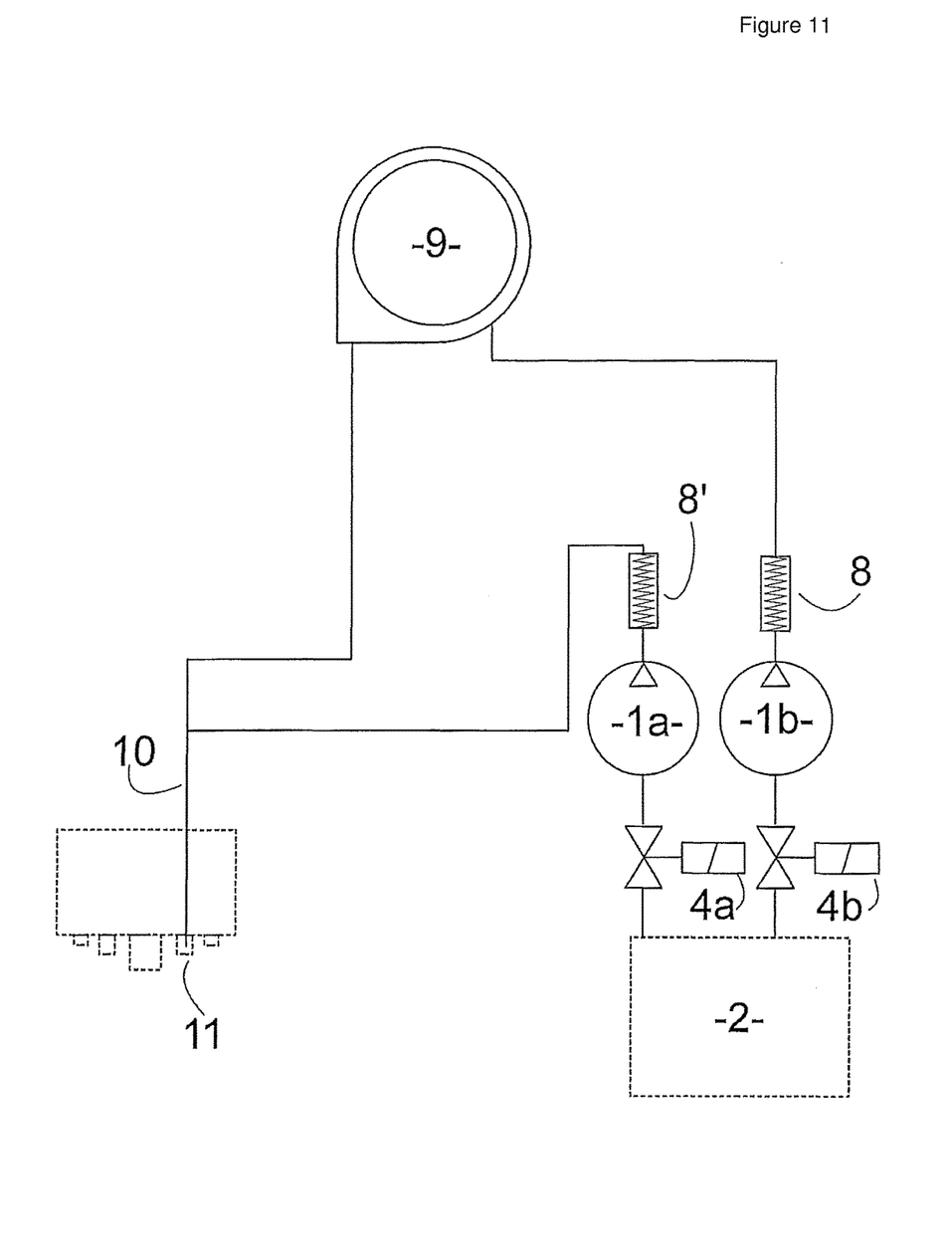

FIG. 11 shows another exemplary embodiment, in which a first pump 1a is provided with a first air valve 4a, which is arranged at the suction side of the pump, with a mixing element 8 being arranged at the pressure side of the first pump 1a. With these components, here cold milk froth can be dispensed at the outlet 11. Furthermore, a second pump 1b is provided with a second air valve 4b arranged at the suction side of the second pump 1b. A mixing element 8 is provided at the pressure side of the second pump 1b and a continuous-flow heater 9 downstream in reference to the mixing element 8, so that via the second pump 1b warm milk froth can be dispensed at the outlet 11. Accordingly, here two separate conveyer liners are provided to convey milk from the milk container 2. Accordingly no branching of the line occurs into two parallel line sections.

Figure 12:
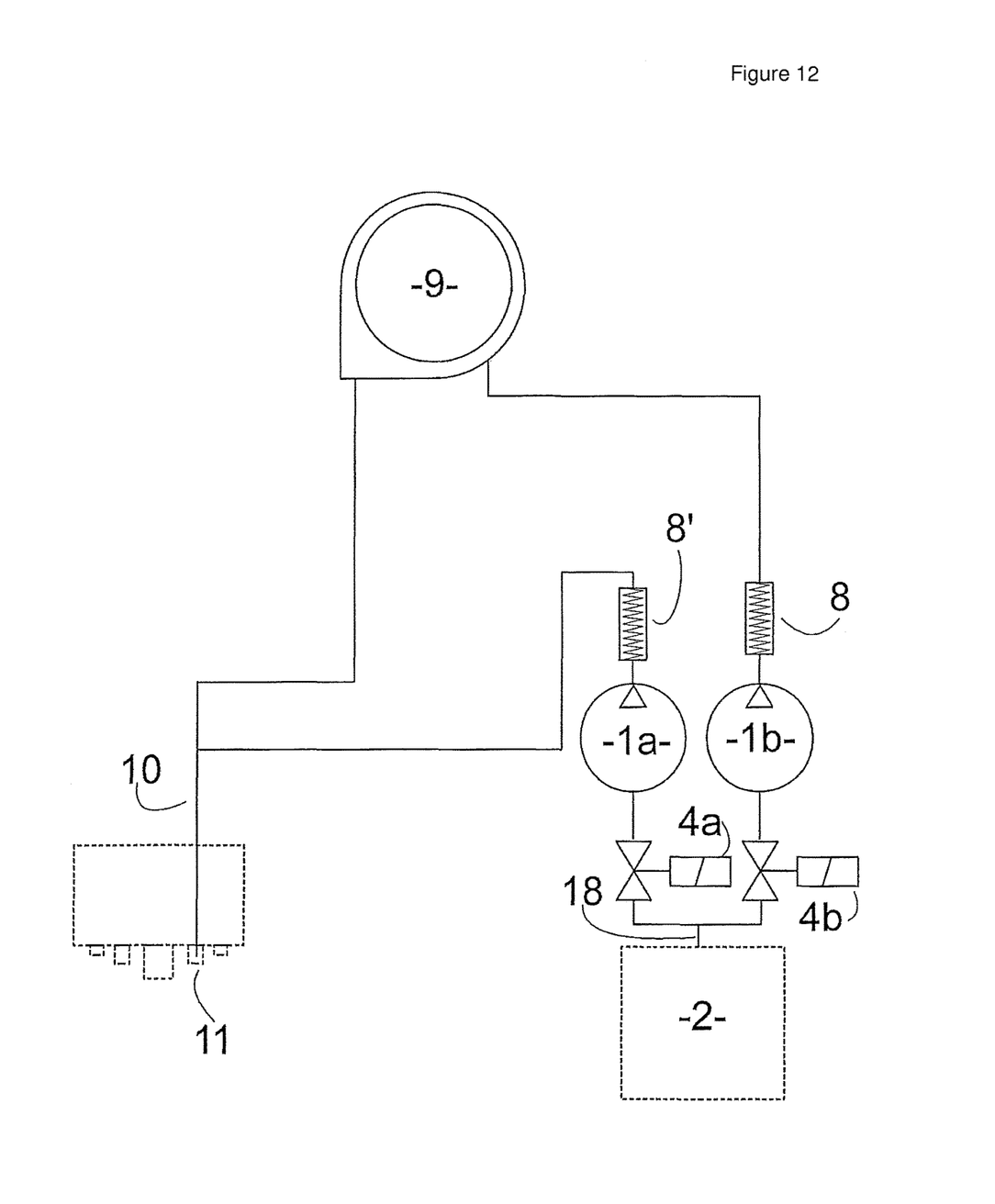

The exemplary embodiment according to FIG. 12 represents a variant of the exemplary embodiment according to FIG. 11.

Here a common conveyer line 18 is provided in order to optionally convey milk from the milk reservoir 2 via optionally the first pump 1a or the second pump 1b. The conveyer line 18 branches into a suction line, which is connected at the suction side with the first pump 1a, and another suction line, which is connected at the suction side to the second pump 1b.

Similar to the exemplary embodiment according to FIG. 11, the exemplary embodiment according to FIG. 12 provides respectively one air valve each per pump. Alternatively, instead of the first air valve 4a and the second air valve 4b, here only one common air valve 4 may be arranged in the conveyer line 18.

The invention claimed is:

1. A device for generating milk froth, comprising a pump (1, 1a, 1b) for conveying milk from a reservoir, an air inlet, and at least one back-pressure element arranged downstream in reference to the pump, the air inlet is upstream in reference to the back-pressure element, the back-pressure element comprises a mixing element (8, 8') having a cross-sectional area that a flow passes through which is not constricted along an entire length of the mixing element in a direction of flow, with a cross-sectional area that the flow passes through at an input side being equivalent at least to a cross-sectional area of a connection line arranged between the pump (1, 1a, 1b) and the mixing element (8, 8').

2. The device according to claim 1, wherein the pipeline is unrestricted between the pump (1, 1a, 1b) and the mixing element (8, 8').

3. The device according to claim 1, wherein the pump (1, 1a, 1b) is a gear pump.

4. The device according to claim 1, wherein the air intake is arranged at a suction side of the pump (1, 1a, 1b).

5. The device according to claim 2, wherein in the line between the pump (1, 1a, 1b) and the mixing element (8, 8') a cross-sectional area that the flow passes through is not reduced, and an outlet (11) for the milk froth that is arranged downstream in reference to the mixing element has a cross-sectional area that the flow passes through that is equal to or greater than the cross-sectional area in the line.

6. A device for generating milk froth, comprising a pump (1, 1a, 1b) for conveying milk from a reservoir, an air inlet, and at least one back-pressure element arranged downstream in reference to the pump, the air inlet is upstream in reference to the back-pressure element, the back-pressure element comprises a mixing element (8, 8') having a cross-sectional area that a flow passes through which is not reducing in a direction of flow, with a cross-sectional area that the flow passes through at an input side being equivalent at least to a cross-sectional area of a connection line arranged between the pump (1, 1a, 1b) and the mixing element (8, 8'), and the mixing element (8, 8') comprises at least first and second separating elements (13a, 13b) which are embodied cooperating with each other and arranged behind each other in a flow path of a fluid flowing therethrough such that a splitting into two or more partial flows or a mixing of the partial flows of the fluid flowing through occurs.

7. The device according to claim 6, wherein the separating elements (13a, 13b) form at least sectionally helical flow paths of the partial flows.

8. The device according to claim 6, wherein the separating elements (13a, 13b) are embodied as helical elements, and the mixing element (8, 8') is embodied as a helical mixer.

9. The device according to claim 6, wherein at least 3 separating elements (13a, 13b) are provided one behind the other.

10. The device according to claim 6, wherein the flow path of the fluid flowing through at least the first separating element (13a) is arranged such that the first separating element (13a) splits the fluid entering the mixing element (8, 8') into at least a first and a second partial flow, and at least the second separating element (13b) is arranged in the flow path of the mixing element downstream in reference to the first separating element, said second separating element (13b) splits both the first as well as the second partial flow of the first separating element (13a) and cooperates with the first separating element (13a) such that a portion of the first partial flow of the first separating element (13a) is combined with a portion of the second partial flow of the first separating element (13a) to form a new partial flow.

11. The device according to claim 7, wherein a direction of rotation of the helical flow path of the first separating element is opposite a direction of rotation of the helical flow path of the second separating element.

12. A device for generating milk froth, comprising
a pump (1, 1a, 1b) for conveying milk from a reservoir, an air inlet, and at least one back-pressure element arranged downstream in reference to the pump, the air inlet is upstream in reference to the back-pressure element, the back-pressure element comprises a mixing element (8, 8') having a cross-sectional area that a flow passes through which is not reducing in a direction of flow, with a cross-sectional area that the flow passes through at an input side being equivalent at least to a cross-sectional area of a connection line arranged between the pump (1, 1a, 1b) and the mixing element (8, 8'), two parallel flow path sections (7a, 7b) for the optional generation of warm or cold milk froth, and a continuous-flow heater (9) being arranged in a first of the flow path sections (7a).

13. The device according to claim 12, wherein at a pressure side of the pump (1) a branching is provided into the two parallel flow path sections, and the mixing element (8') is arranged in at least in the second parallel flow path section (7b) without the continuous-flow heater (9).

14. The device according to claim 13, further comprising a second back-pressure element arranged in the first parallel flow path section (7a) downstream in reference to the continuous-flow heater, the second back-pressure element comprising a second mixing element (8).

15. A method for generating milk froth, comprising the following processing steps:
a) conveying milk from a reservoir via a pump (1, 1a, 1b),
b) supplying air to the milk, and
c) guiding the milk mixed with air or the milk froth or both through a back-pressure element at a pressure side of the pump (1, 1a, 1b), the back-pressure element comprising a mixing element (8, 8') having a cross-sectional area that the flow passes through that is not constricted along an entire length of the mixing element in a direction of flow, which at an input side is at least equivalent to a cross-section of a connection line arranged between the pump (1, 1a, 1b) and the mixing element (8, 8').

16. The method according to claim 15, further comprising generating the milk froth from refrigerated milk.

17. The method according to claim 15, wherein an essentially laminar mixing occurs in the mixing element (8, 8').

18. The method according to claim 15, further comprising guiding the milk-air mixture through a continuous-flow heater (9) at the pressure side of the pump (1), with at least during the generation of cold milk froth, circumventing the continuous-flow heater, and guiding the milk-air mixture through the mixing element (8, 8').

19. The method of claim 16, further comprising subsequently heating the milk forth.

* * * * *